(12) United States Patent
Zhang (10) Patent No.: US 11,936,474 B2
(45) Date of Patent: Mar. 19, 2024

(54) TRANSMISSION ANTENNA SWITCHING METHOD AND TERMINAL DEVICE

(71) Applicant: VIVO MOBILE COMMUNICATION CO., LTD., Guangdong (CN)

(72) Inventor: Sha Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 136 days.

(21) Appl. No.: 17/570,122

(22) Filed: Jan. 6, 2022

(65) Prior Publication Data
US 2022/0131636 A1  Apr. 28, 2022

Related U.S. Application Data

(63) Continuation of application No. PCT/CN2020/098842, filed on Jun. 29, 2020.

(30) Foreign Application Priority Data

Jul. 8, 2019 (CN) .......................... 201910609658.5

(51) Int. Cl.
*H04L 1/00* (2006.01)
*H04L 5/00* (2006.01)
*H04L 5/14* (2006.01)
*H04W 76/16* (2018.01)

(52) U.S. Cl.
CPC .......... *H04L 1/0025* (2013.01); *H04L 5/0051* (2013.01); *H04L 5/14* (2013.01); *H04W 76/16* (2018.02)

(58) Field of Classification Search
CPC ................................ H04L 5/14; H04W 76/16
See application file for complete search history.

(56) References Cited

U.S. PATENT DOCUMENTS

2011/0058505 A1  3/2011  Pan et al.
2015/0056933 A1  2/2015  Yan et al.
(Continued)

FOREIGN PATENT DOCUMENTS

| CN | 101572896 A | 11/2009 |
| CN | 105493411 A | 4/2016 |
| CN | 106231642 A | 12/2016 |

(Continued)

OTHER PUBLICATIONS

Meeting minutes on RAN4 Rel-16 NR RRM scope, 3GPP TSG-RAN Meeting #84, RP-191577, 3-6, Jun. 2019, Newport Beach, USA. Source: Intel.

(Continued)

*Primary Examiner* — Jackie Zuniga Abad
(74) *Attorney, Agent, or Firm* — IP & T GROUP LLP (57) ABSTRACT

A transmission antenna switching method includes: in a case that the terminal device is in a dual network connected state, determining a first network used to transmit control plane data and a second network only used to transmit user plane data; determining a working mode of the second network in a case that an SRS switching request is received; determining a priority order of transmission antenna switching in the first network and the second network according to the working mode of the second network; and performing SRS antenna switching in the first network according to the priority order.

15 Claims, 6 Drawing Sheets

(56) References Cited

U.S. PATENT DOCUMENTS

2018/0083690 A1  3/2018 Lan et al.
2020/0382250 A1* 12/2020 Choi ................... H04L 5/0048

FOREIGN PATENT DOCUMENTS

| | | |
|---|---|---|
| CN | 108055065 A | 5/2018 |
| CN | 109361444 A | 2/2019 |
| CN | 109922528 A | 6/2019 |
| CN | 110299936 A | 10/2019 |
| WO | 2012/116091 A1 | 8/2012 |
| WO | 2017/173388 A1 | 10/2017 |

OTHER PUBLICATIONS

International Search Report and Written Opinion of International Application No. PCT/CN2020/098842 issued by the Chinese Patent Office dated Sep. 28, 2020.
First Office Action of priority application No. CN 201910609658.5 issued by the Chinese Patent Office dated May 31, 2021.

* cited by examiner

TRANSMISSION ANTENNA SWITCHING METHOD AND TERMINAL DEVICE

CROSS-REFERENCE OF RELATED APPLICATIONS

This application is a Bypass Continuation Application of PCT/CN2020/098842 filed on Jun. 29, 2020, which claims priority to Chinese Patent Application No. 201910609658.5 filed on Jul. 8, 2019, which are incorporated herein by reference in their entirety.

TECHNICAL FIELD

The present disclosure relates to the field of communication technologies, and in particular, to a transmission antenna switching method and a terminal device.

BACKGROUND

Networks of the fifth-generation (5G) communication system adopt two networking methods in the development and construction process: non-standalone (NSA) networking and standalone (SA) networking. When a terminal device communicates with a base station in an NSA network, if the terminal device uses the dual-connection mode of long term evolution (LTE) and 5G new radio (NR) for communication, an LTE band and an NR band need to work at the same time.

SUMMARY

The embodiments of the present disclosure provide a transmission antenna switching method and a terminal device.

According to a first aspect, the embodiments of this disclosure provide a transmission antenna switching method, applied to a terminal device. The method includes:
  in a case that the terminal device is in a dual network connected state, determining a first network used to transmit control plane data and a second network only used to transmit user plane data;
  determining a working mode of the second network in a case that a sounding reference signal (SRS) switching request is received;
  determining a priority order of transmission antenna switching in the first network and the second network according to the working mode of the second network; and
  performing SRS antenna switching in the first network according to the priority order.

According to a second aspect, the embodiments of this disclosure further provide a terminal device, including:
  a first determining module, configured to: in a case that the terminal device is in a dual network connected state, determine a first network used to transmit control plane data and a second network only used to transmit user plane data;
  a second determining module, configured to determine a working mode of the second network in a case that a sounding reference signal SRS switching request is received;
  a third determining module, configured to determine a priority order of transmission antenna switching in the first network and the second network according to the working mode of the second network; and
  a switching module, configured to perform SRS antenna switching in the first network according to the priority order.

According to a third aspect, the embodiments of the present disclosure further provide a terminal device, including a processor, a memory, and a computer program stored in the memory and executable on the processor. The computer program, when executed by the processor, implements the steps of the foregoing transmission antenna switching method.

According to a fourth aspect, the embodiments of the present disclosure further provide a non-transitory computer-readable storage medium, where the non-transitory computer-readable storage medium stores a computer program. The computer program, when executed by a processor, implements the steps of the foregoing transmission antenna switching method.

BRIEF DESCRIPTION OF DRAWINGS

To describe the technical solutions in embodiments of the present disclosure more clearly, the following briefly describes the accompanying drawings required for describing the embodiments of the present disclosure. Clearly, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

Because the terminal device needs to perform transmission antenna switching in the LTE band, to optimize signal quality of signaling connection in the LTE band, and at the same time, because the terminal device needs to perform sounding reference signal (SRS) antenna switching in the NR band, so that a base station learns channel quality of an antenna of the terminal device. The terminal device needs perform transmission antenna switching while performing SRS antenna switching. Therefore, the LTE band and the NR band would conflict with each other during transmission antenna switching, which affects communication quality. That is, when the terminal device uses two networks at the same time, there is a conflict during transmission antenna switching, which affects communication quality.

Figure 1:
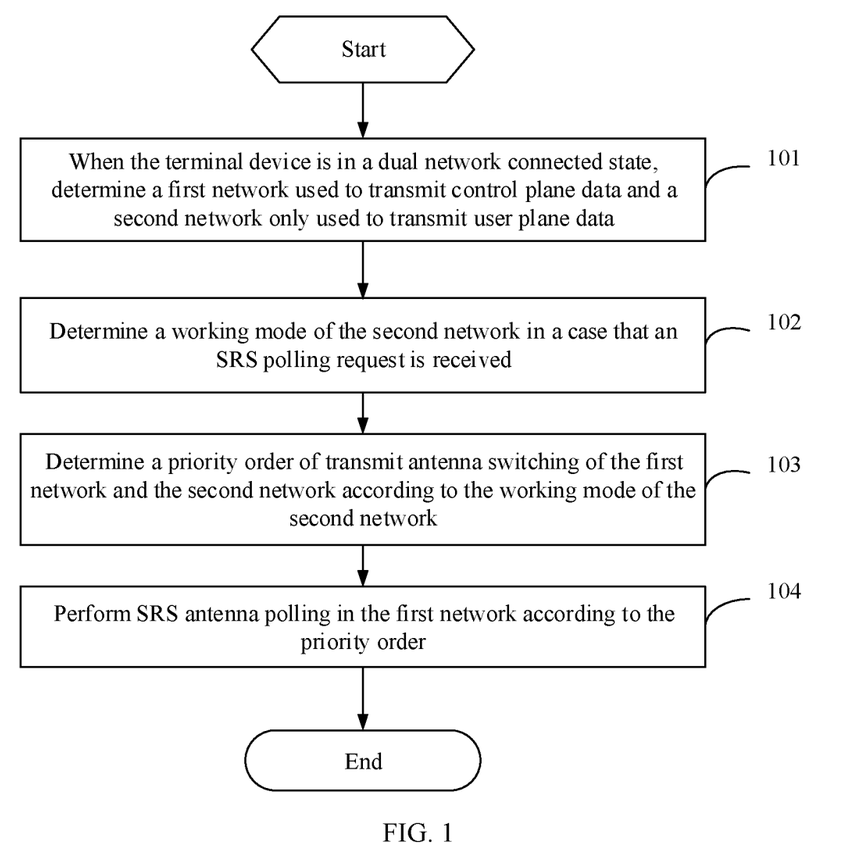
FIG. 1 is a flowchart 1 of a transmission antenna switching method according to an embodiment of the present disclosure.

Referring to FIG. 1, FIG. 1 is a flowchart 1 of a transmission antenna switching method according to an embodiment of the present disclosure. As shown in FIG. 1, the embodiment of the present disclosure provides a transmission antenna switching method applied to a terminal device. The method includes the following steps.

Step 101: in a case that the terminal device is in a dual network connected state, determine a first network used to transmit control plane data and a second network only used to transmit user plane data.

The terminal device is connected to the first network and the second network at the same time. The first network is used to transmit control plane data, and the control plane data is used to ensure a stable connection between the terminal device and a base station. The first network is also used to transmit user plane data. The second network is not used to transmit control plane data, and is only used to transmit user plane data.

This embodiment can be applied to the network architecture option 4/4a in an NSA mode. In this network architecture option, the first network is an NR network and the second network is an LTE network. Control plane data and data plane data are transmitted between the terminal device and the NR network (that is, the first network), and only user plane data is transmitted between the terminal device and the LTE network (that is, the second network).

Step 102: Determine a working mode of the second network in a case that an SRS switching request is received.

When the terminal device receives an SRS switching request, the terminal device needs to perform SRS antenna switching. SRS antenna switching intends to help the base station to learn channel quality of an antenna (for example, a transmission antenna supporting the first network) of the terminal device. During SRS antenna switching, all switching antennas send an SRS to the base station. During SRS antenna switching, a transmission antenna of the first network sends an SRS in a switching manner, so that the base station obtains performance of a receive antenna of the first network (receiving and transmitting are performed at a same frequency). That is, the channel quality of the receive antenna of the first network is obtained through the transmission antenna of the first network.

The working mode of the second network includes time division duplexing (TDD) and frequency division duplexing (FDD). In the TDD working mode, an uplink and a downlink of the second network use different slots to communicate with the terminal device. In the FDD working mode, the uplink and the downlink of the second network use different frequencies to communicate with the terminal device. It is determined whether the second network uses the TDD working mode or the FDD working mode in a case that a sounding reference signal SRS switching request is received.

Step 103: Determine a priority order of transmission antenna switching in the first network and the second network according to the working mode of the second network.

When the second network is in different working modes, transmission antenna switching in the first network and the second network has different priority orders. For example, when the second network is the TDD working mode, it may be set that a priority of the first network is lower than a priority of the second network, or when the second network is the FDD working mode, it may be set that the priority of the first network is higher than a priority of the second network.

Step 104: Perform SRS antenna switching in the first network according to the priority order.

Optionally, the priority order of transmission antenna switching in the first network and the second network is determined according to the working mode of the second network, thereby determining the timing of SRS antenna switching in the first network. Alternatively, data transmission of the second network is stopped, and then the terminal device performs SRS antenna switching in the first network to avoid that the second network contends for antenna resources with the first network during SRS antenna switching in the first network, thereby affecting communication quality.

In the embodiments of the present disclosure, the terminal device may be a mobile phone, a tablet computer, a laptop computer, a personal digital assistant (PDA), a mobile Internet device (MID), a wearable device, or the like.

In the transmission antenna switching method in the embodiments of the present disclosure, in a case that the terminal device is in a dual network connected state, the terminal device determines a first network used to transmit control plane data and a second network only used to transmit user plane data; determines a working mode of the second network in a case that a sounding reference signal SRS switching request is received; determines a priority order of transmission antenna switching in the first network and the second network according to the working mode of the second network; and performs SRS antenna switching in the first network according to the priority order. In this way, the priority order of transmission antenna switching in the first network and the second network is determined, and then SRS antenna switching is performed, to avoid antenna resource contention conflict between the first network and the second network during transmission antenna switching, to improve communication quality.

Figure 2A:
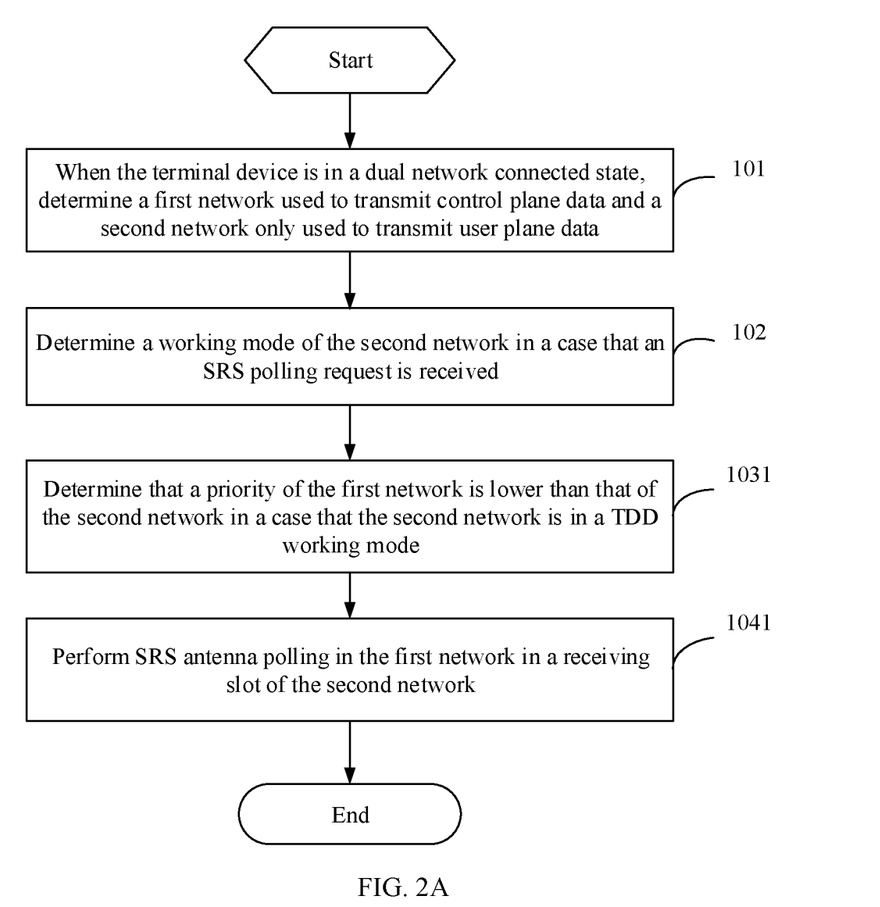
FIG. 2A is a flowchart 2 of a transmission antenna switching method according to an embodiment of the present disclosure.

Optionally, in an embodiment of the present disclosure, as shown in FIG. 2A, step 103 of determining a priority order of transmission antenna switching in the first network and the second network according to the working mode of the second network includes:

Step 1031: Determine that the priority of the first network is lower than the priority of the second network in a case that the second network is in a TDD working mode.

Step 104 of performing SRS antenna switching in the first network according to the priority order includes:

Step 1041: Perform SRS antenna switching in the first network in a receiving slot of the second network.

Optionally, when the second network works in the TDD working mode, since data is received in the receiving slot of the second network, performing SRS antenna switching in the receiving slot of the second network does not affect data transmission of the second network, that is, the SRS antenna switching in the receiving slot of the second network does not conflict with the use of the transmission antenna of the second network.

Figure 2B:
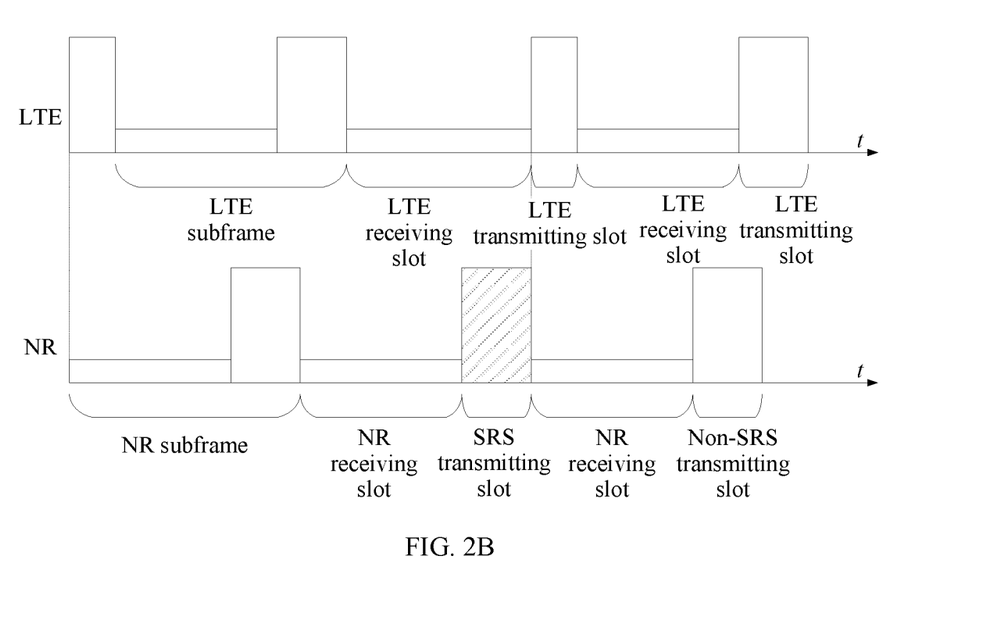
FIG. 2B is a schematic diagram of distribution of transmission slots and receiving slots of an LTE network and an NR network according to an embodiment of the present disclosure.

As shown in FIG. 2B, the first network is an NR network, and the second network is an LTE network. SRS antenna switching on the NR band is performed in the receiving slot of the LTE band.

In this embodiment, when the first network performs SRS antenna switching, an antenna set may be used for SRS antenna switching, and the antenna set includes an antenna used by the second network in a transmitting slot.

In this embodiment, when the second network is in the TDD working mode, SRS antenna switching is performed in the first network in the receiving slot of the second network. This can ensure preferentially the normal function requirement of the first network (that is, the SRS antenna switching requirement of the first network), effectively avoid that the first network and the second network contend for the transmission antenna, and improve communication quality. Moreover, performing SRS antenna switching in the receiving slot of the second network by the terminal device does not affect data transmission of the second network, and the signal quality of the second network is ensured during data transmission.

Figure 3A:
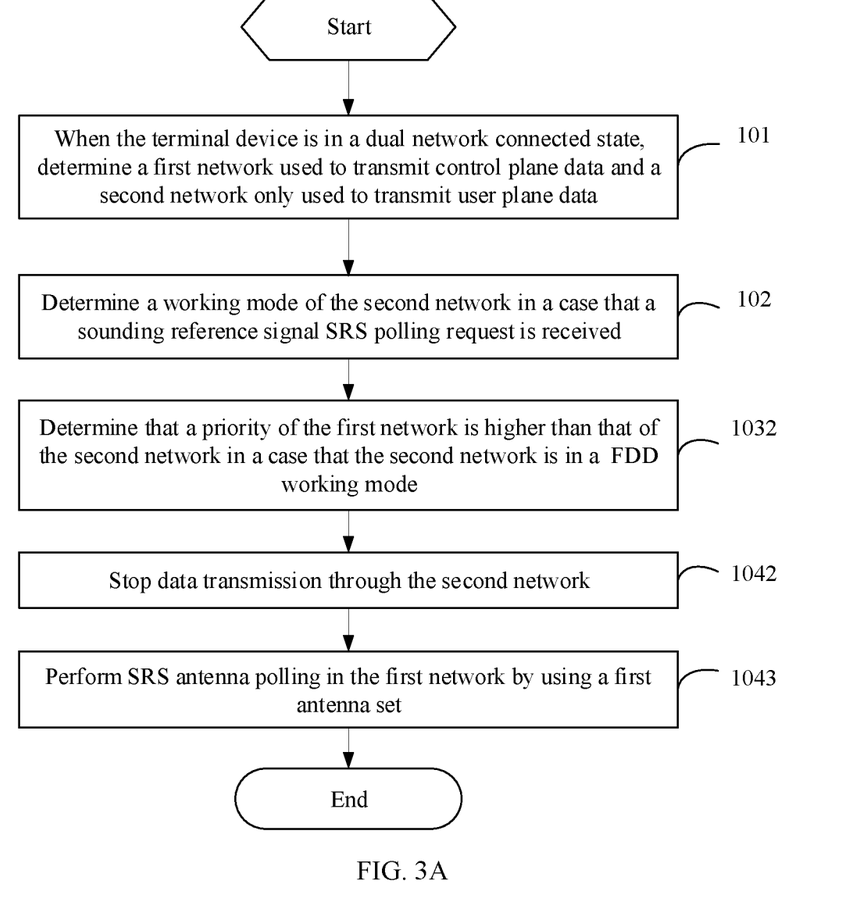
FIG. 3A is a flowchart 3 of a transmission antenna switching method according to an embodiment of the present disclosure.

Optionally, in another embodiment of the present disclosure, as shown in FIG. 3A, the step 103 of determining a priority order of transmission antenna switching in the first network and the second network according to the working mode of the second network includes:

Step 1032: Determine that a priority of the first network is higher than a priority of the second network in a case that the second network is in a FDD working mode.

Step 104 of performing SRS antenna switching in the first network according to the priority order includes:

Step 1042: Stop data transmission through the second network.

Optionally, stopping data transmission through the second network can be understood as: stopping sending data of the second network through software control, but a physical path for data transmission of the second network is connected; or stopping sending data of the second network through software control, and the physical path for data transmission of the second network is disconnected. When data transmission of the second network is stopped, it can be considered that the second network stops using the transmission antenna. When the second network is in the FDD working mode, data transmission and data receiving of the second network are performed at different frequencies. Stopping data transmission of the second network has little impact on data receiving of the second network, and the downlink communication capability of the second network can still be guaranteed.

When the second network is in the FDD working mode, data transmission through the second network is stopped. Since the second network does not use the transmission antenna, a conflict between SRS switching in the first network and the usage of the transmission antenna by the second network can be avoided.

In an embodiment of the present disclosure, step 1032 of stopping data transmission through the second network includes:

determining a slot or a symbol period of the SRS antenna switching; and
stopping data transmission through the second network in the slot or the symbol period.

Figure 3B:
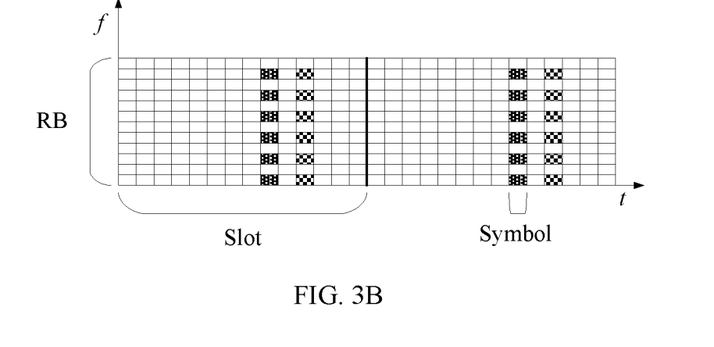
FIG. 3B is a schematic diagram of a time-frequency structure of SRS antenna switching of a first network.

FIG. 3B shows a time-frequency structure of 1T4R SRS antenna switching in an NR band. In this time-frequency structure, 1T4R SRS antenna switching in the NR band occupies two slots, an SRS signal is only transmitted in a specific symbol of a specific slot, an SRS is transmitted in the last 6 symbols of a slot at most, and most slots and symbols of the slots are used to transmit uplink and downlink control signals and data signals and the like.

Data transmission of the second network can be stopped in the slot of SRS antenna switching. For example, if an SRS signal of SRS antenna switching is sent in a first slot, data transmission of the second network is stopped in the first slot. If the SRS signal of SRS antenna switching is sent in the last 6 symbols of a slot, data transmission of the second network is stopped in the last 6 symbols of the slot.

In this embodiment, a slot or a symbol period of SRS antenna switching is determined, and data transmission through the second network is stopped in the slot or the symbol period. This can avoid a conflict between SRS switching in the first network and the usage of the transmission antenna by the second network. Therefore, this can ensure preferentially the normal functional requirement of the first network (that is, the SRS antenna switching requirement of the first network), effectively avoid that the first network and the second network contend for the transmission antenna, and improve communication quality.

According to the current 3GPP definition, the NR band uses, for example, a 30 KHz subcarrier spacing. A slot includes 14 symbols and the slot is 0.5 ms, that is, the time of 1 symbol is about 35.7 us, and an SRS is sent in the last 6 symbols of a slot at most. In time domain, a resource scheduling period of an LTE band is 1 ms. If LTE data transmission is stopped in a symbol period of SRS antenna switching, because the time occupied by SRS signal transmission accounts for a very small proportion of the LTE resource scheduling period, stopping LTE data transmission in the symbol period of SRS antenna switching has little impact on LTE transmission communication and can be ignored.

Step 1043: Perform SRS antenna switching in the first network by using a first antenna set, where the first antenna set includes a transmission antenna used by the second network.

Optionally, because the data transmission of the second network is stopped, when the first network performs SRS antenna switching, the transmission antenna used by the second network can be used. This can avoid a conflict between SRS switching in the first network and the usage of the transmission antenna by the second network. This can ensure preferentially the normal functional requirement of the first network (that is, the SRS antenna switching requirement of the first network), effectively avoid that the first network and the second network contend for the transmission antenna, and improve communication quality.

Optionally, to enable the terminal device to use more antennas when performing SRS antenna switching in the first network, the stopping data transmission through the second network in the slot or the symbol period includes:

stopping data transmission and data receiving through the second network in the slot or the symbol period; and
the performing SRS antenna switching in the first network by using a first antenna set includes:
performing SRS antenna switching in the first network by using a second antenna set, where the second antenna set includes a receiving antenna used by the second network and an antenna in the first antenna set.

In this embodiment, in the slot or the symbol period, not only data transmission of the second network is stopped, but also data receiving of the second network is stopped. In this way, not only an antenna used for the data transmission of the second network can be used for SRS antenna switching in the first network, but also an antenna used by the second network for data receiving can be used by the first network for SRS antenna switching, so that the first network has more antennas to switch during SRS antenna switching.

Because data transmission and data receiving of the second network are stopped, when the first network performs SRS antenna switching, the transmission antenna and the receive antenna used by the second network can be used. This can avoid a conflict between SRS switching in the first network and the usage of the transmission antenna by the second network. Besides, the first network has more antennas to switch during SRS antenna switching.

Figure 4:
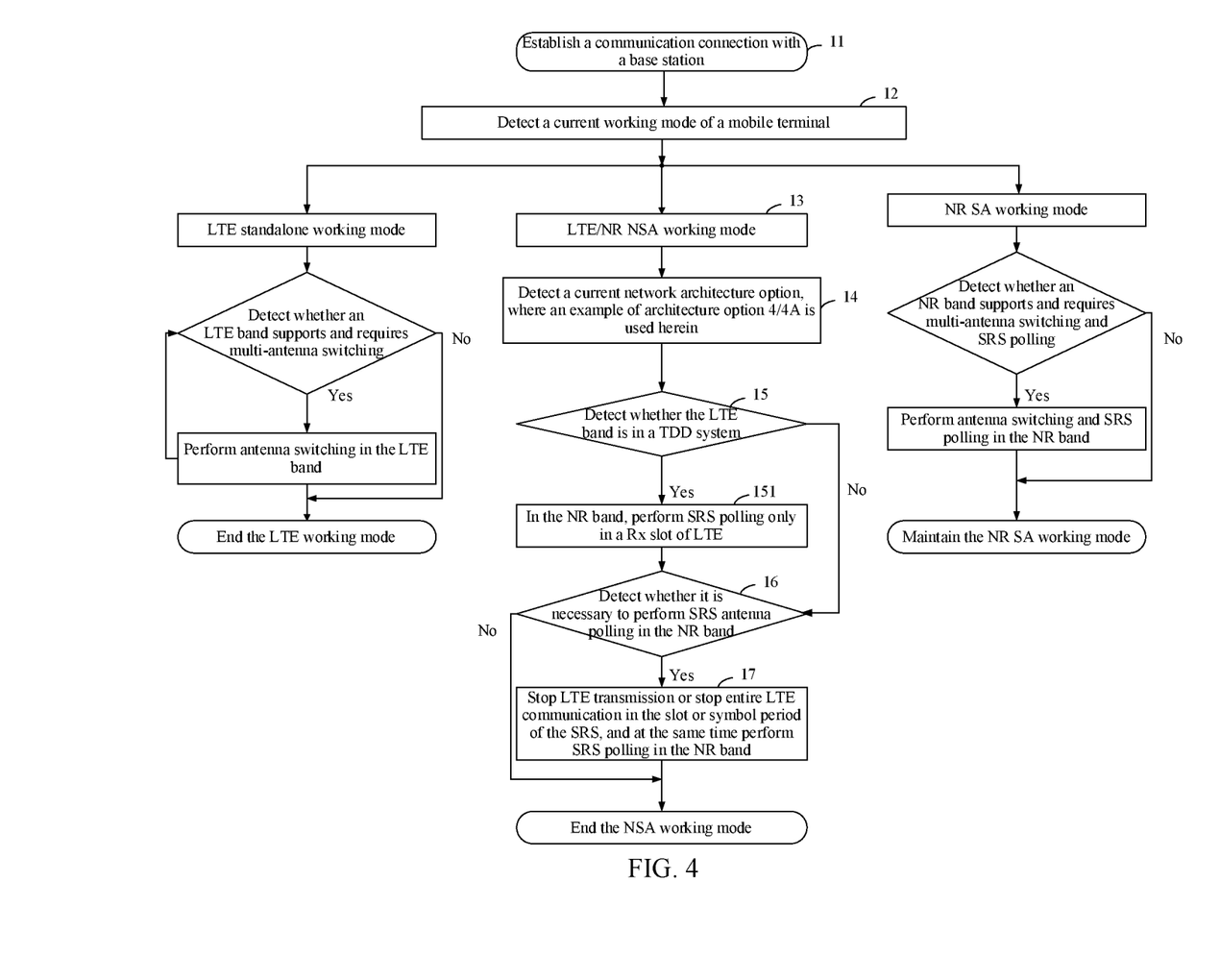
FIG. 4 is a flowchart 4 of a transmission antenna switching method according to an embodiment of the present disclosure.

As shown in FIG. 4, the antenna switching process of the terminal device is as follows.

Step 11. Establish a communication connection with the base station.

Step 12. Detect the working mode of the terminal device, to determine whether the terminal device works in the dual network mode of an LTE network and an NR network.

Step 13. The terminal device works in an NSA mode.

Step 14. Detect a network architecture option of the current NSA mode, where the network architecture is Option4/4A.

Step 15. Detect whether the LTE band is in a TDD system; if the LTE band is in a TDD system, turn to perform step 151; and if the LTE band is not in a TDD system, turn to perform step 16.

Step 151. In the NR band, perform SRS antenna switching only in a Rx (that is, receiving) slot of LTE.

Step 16. Detect whether it is necessary to perform SRS antenna switching in the NR band; if yes, turn to perform step 17; and if not, end the NSA working mode.

Step 17. Stop LTE transmission or stop entire LTE communication in the slot or the symbol period of the SRS antenna switching, and at the same time perform SRS switching in the NR band.

Figure 5:
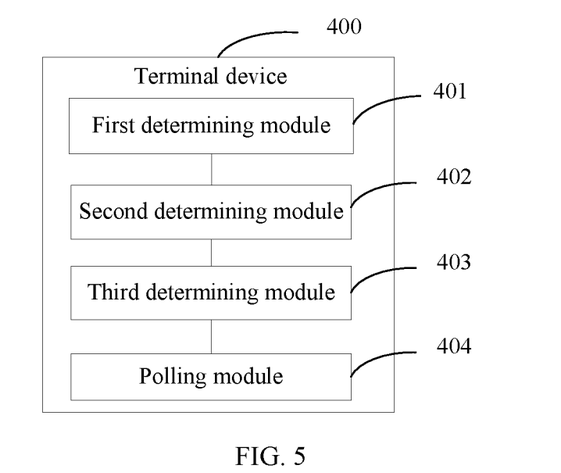
FIG. 5 is a structural diagram of a terminal device according to an embodiment of the present disclosure.

Referring to FIG. 5, FIG. 5 is a structural diagram 1 of a terminal device according to an embodiment of the present disclosure. As shown in FIG. 5, the embodiment provides a terminal device 400, including:

a first determining module 401, configured to: in a case that the terminal device is in a dual network connected state, determine a first network used to transmit control plane data and a second network only used to transmit user plane data;

a second determining module 402, configured to determine a working mode of the second network in a case that a sounding reference signal SRS switching request is received;

a third determining module 403, configured to determine a priority order of transmission antenna switching in the first network and the second network according to the working mode of the second network; and a switching module 404, configured to perform SRS antenna switching in the first network according to the priority order.

Optionally, the third determining module 403 is configured to determine that a priority of the first network is lower than a priority of the second network in a case that the second network is in a TDD working mode; and the switching module 404 is configured to perform SRS antenna switching in the first network in a receiving slot of the second network.

Optionally, the third determining module 403 is configured to determine that a priority of the first network is higher than a priority of the second network in a case that the second network is in a time division duplex FDD working mode; and the switching module 404 includes:

a stopping submodule, configured to stop data transmission through the second network; and a switching submodule, configured to perform SRS antenna switching in the first network by using a first antenna set, where the first antenna set includes a transmission antenna used by the second network.

Optionally, the stopping submodule includes:

a determining unit, configured to determine a slot or a symbol period of the SRS antenna switching; and a stopping unit, configured to stop data transmission through the second network in the slot or the symbol period.

Optionally, the stopping unit is configured to:

stop data transmission and data receiving through the second network in the slot or the symbol period.

The switching submodule is configured to:

perform SRS antenna switching in the first network by using a second antenna set, where the second antenna set includes a receiving antenna used by the second network and an antenna in the first antenna set.

The terminal device 400 can implement the processes implemented by the terminal device in the method embodiments in FIG. 1, FIG. 2A, and FIG. 3A. To avoid repetition, details are not described herein again.

In the embodiments of the present disclosure, in a case that the terminal device 400 is in a dual network connected state, the terminal device 400 determines a first network used to transmit control plane data and a second network only used to transmit user plane data; determines a working mode of the second network in a case that a sounding reference signal SRS switching request is received; determines a priority order of transmission antenna switching in the first network and the second network according to the working mode of the second network; and performs SRS antenna switching in the first network according to the priority order. In this way, the priority order of transmission antenna switching in the first network and the second network is determined, and then SRS antenna switching is performed, to avoid antenna resource contention conflict between the first network and the second network during transmission antenna switching, to improve communication quality.

Figure 6:
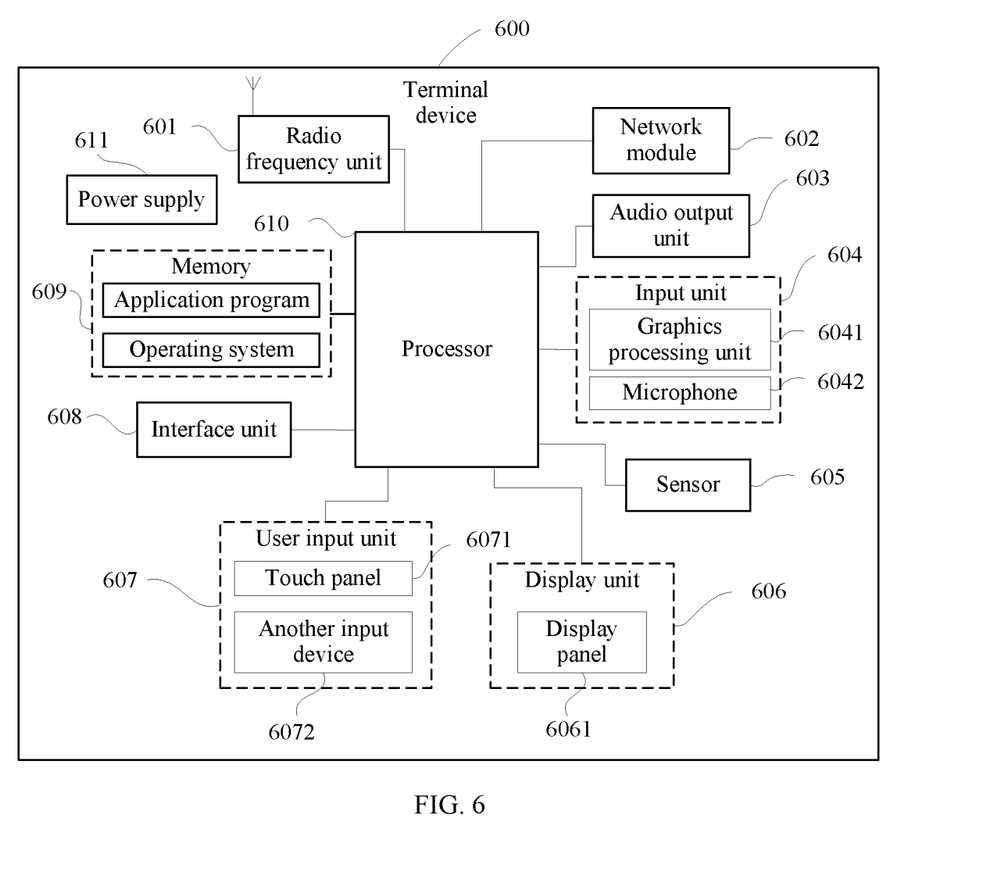
FIG. 6 is a structural diagram of a terminal device according to another embodiment of the present disclosure.

FIG. 6 is a schematic diagram of a hardware structure of a terminal device implementing the various embodiments of the present disclosure. As shown in FIG. 6, the terminal device 600 includes, but not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal device shown in FIG. 6 does not constitute a limitation to the terminal device. The terminal device may include more or fewer components than that shown in the figure, or a combination of some components, or an arrangement of different components. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The processor 610 is configured to: in a case that the terminal device is in a dual network connected state, determine a first network used to transmit control plane data and a second network only used to transmit user plane data;

determine a working mode of the second network in a case that a sounding reference signal SRS switching request is received;

determine a priority order of transmission antenna switching in the first network and the second network according to the working mode of the second network; and perform SRS antenna switching in the first network according to the priority order.

Optionally, the processor 610 is further configured to:

determine that the priority of the first network is lower than the priority of the second network in a case that the second network is in a TDD working mode; and perform SRS antenna switching in the first network in a receiving slot of the second network.

Optionally, the processor 610 is further configured to:

determine that the priority of the first network is higher than the priority of the second network in a case that the second network is in a FDD working mode; and stop data transmission through the second network; and perform SRS antenna switching in the first network by using a first antenna set, where the first antenna set includes a transmission antenna used by the second network.

Optionally, the processor 610 is further configured to:

determine a slot or a symbol period of the SRS antenna switching; and stop data transmission through the second network in the slot or the symbol period.

Optionally, the processor 610 is further configured to:

stop data transmission and data receiving through the second network in the slot or the symbol period; and the performing SRS antenna switching in the first network by using a first antenna set includes:

perform SRS antenna switching in the first network by using a second antenna set, where the second antenna set includes a receiving antenna used by the second network and an antenna in the first antenna set.

The terminal device 600 can implement each process implemented by the terminal device in the foregoing embodiments. To avoid repetition, details are not described herein again.

In the embodiments of the present disclosure, in a case that the terminal device 600 is in a dual network connected state, the terminal device 600 determines a first network used to transmit control plane data and a second network only used to transmit user plane data; determines a working mode of the second network in a case that a sounding reference signal SRS switching request is received; determines a priority order of transmission antenna switching in the first network and the second network according to the working mode of the second network; and performs SRS antenna switching in the first network according to the priority order. In this way, the priority order of transmission antenna switching in the first network and the second network is determined, and then SRS antenna switching is performed, to avoid antenna resource contention conflict between the first network and the second network during transmission antenna switching, to improve communication quality.

It should be understood that in the embodiments of the present disclosure, the radio frequency unit 601 can be configured to receive and send information or receive and send signal during calls. Optionally, the radio frequency unit receives downlink data from a base station, and transmits the downlink data to the processor 610 for processing. In addition, the radio frequency unit sends uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal device provides a user with wireless broadband Internet access through the network module 602, for example, helps the user send and receive emails, browse web pages, and access streaming media.

The audio output unit 603 can convert audio data received by the radio frequency unit 601 or the network module 602 or stored in the memory 609 into an audio signal, and output the audio signal into sound. Moreover, the audio output unit 603 may further provide audio output (for example, call signal receiving sound and message receiving sound) related to a specific function performed by the terminal device 600. The audio output unit 603 includes a speaker, a buzzer, a telephone receiver, and the like.

The input unit 604 is configured to receive audio or radio frequency signals. The input unit 604 may include a graphics processing unit (GPU) 6041 and a microphone 6042. The graphics processing unit 6041 processes image data of a static picture or a video obtained by an image capture apparatus (for example, a camera) in video capture mode or image capture mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 may receive sound and can process the sound into audio data. The processed audio data can be converted into a format that can be sent to a mobile communications base station through the radio frequency unit 601 in a telephone call mode, for outputting.

The terminal device 600 further includes at least one sensor 605, such as an optical sensor, a motion sensor, and other sensors. Optionally, the optical sensor includes an ambient optical sensor and a proximity sensor. The ambient optical sensor may adjust luminance of the display panel 6061 based on brightness of ambient light. The proximity sensor may turn off the display panel 6061 and/or backlight when the terminal device 600 moves to an ear. As a motion sensor, an accelerometer sensor can detect magnitude of acceleration in various directions (usually three axes), can detect magnitude and the direction of gravity when stationary, can be configured to identify terminal device postures (such as switching between a landscape mode and a portrait mode, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include a display panel 6061. The display panel 6061 may be configured in a form of a liquid crystal display (LCD), an organic light-emitting diode (OLED), or the like.

The user input unit 607 may be configured to receive input numeral or character information, and generate key signal input related to user setting and function control of the terminal device. Optionally, the user input unit 607 includes a touch panel 6071 and another input device 6072. The touch panel 6071, also called a touch screen, may collect a touch operation of the user on or near the touch panel 6071 (for example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 can be implemented in various types such as resistive, capacitive, infrared, and surface acoustic waves. In addition to the touch panel 6071, the user input unit 607 may further include the another input device 6072. Optionally, the another input device 6072 may include but is not limited to a physical keyboard, function keys (such as a volume control key and a switch key), a trackball, a mouse, and a joystick. Details are not described herein.

Optionally, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are configured as two independent components to implement input and output functions of the terminal device, in some embodiments, the touch panel 6071 and the display panel 6061 can be integrated to implement the input and output functions of the terminal device. Details are not limited herein.

The interface unit 608 is an interface for connecting an external apparatus to the terminal device 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive an input (for example, data information or power) from an external apparatus and transmit the received input to one or more elements in the terminal device 600, or transmit data between the terminal device 600 and the external apparatus.

The memory 609 may be configured to store a software program and various data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of the mobile phone, and the like. In addition, the memory 609 may include a high-speed random access memory, and may further include a nonvolatile memory, for example, at least one disk storage device, a flash memory, or other volatile solid-state storage devices.

The processor 610 is a control center of the terminal. The processor 610 uses various interfaces and lines to connect the various parts of the entire terminal device, and performs various functions of the terminal device and processes data by running or executing software programs and/or modules stored in the memory 609 and invoking data stored in the memory 609, to monitor the terminal device as a whole. The processor 610 may include one or more processing units. Optionally, the processor 610 may integrate an application processor and a modem processor. The application processor mainly deals with an operating system, a user interface, and an application. The modem processor mainly deals with wireless communication. It may be understood that the foregoing modem processor may not be integrated into the processor 610.

The terminal device 600 may further include the power supply 611 (such as a battery) supplying power to each component. Preferably, the power supply 611 may be logically connected to the processor 610 by using a power management system, so as to implement functions such as charging management, discharging management and power consumption management by using the power management system.

In addition, the terminal device 600 includes some functional modules that are not shown. Details are not described herein.

Optionally, an embodiment of the present disclosure further provides a terminal device, including a processor 610, a memory 609, and a computer program that is stored in the memory 609 and that can run on the processor 610. When the computer program is executed by the processor 610, the processes of the foregoing embodiment of the transmission antenna switching method are implemented and a same technical effect can be achieved. To avoid repetition, details are not described herein again.

The embodiments of the present disclosure further provide a non-transitory computer-readable storage medium. The non-transitory computer-readable storage medium stores a computer program, and when the computer program is executed by a processor, the processes of the foregoing embodiment of the transmission antenna switching method are implemented and the same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A transmission antenna switching method, applied to a terminal device and comprising:
in a case that the terminal device is in a dual network connected state, determining a first network used to transmit control plane data and a second network only used to transmit user plane data;
determining a working mode of the second network in a case that a sounding reference signal (SRS) switching request is received;
determining a priority order of transmission antenna switching in the first network and the second network according to the working mode of the second network; and
performing SRS antenna switching in the first network according to the priority order; wherein
the determining a priority order of transmission antenna switching in the first network and the second network according to the working mode of the second network comprises:
determining that a priority of the first network is lower than a priority of the second network in a case that the second network is in a time division duplex (TDD) working mode; or
determining that a priority of the first network is higher than a priority of the second network in a case that the second network is in a frequency division duplexing (FDD) working mode.

2. The method according to claim 1, wherein
in a case that the second network is in the TDD working mode, the performing SRS antenna switching in the first network according to the priority order comprises:
performing SRS antenna switching in the first network in a receiving slot of the second network.

3. The method according to claim 1, wherein
in a case that the second network is in the FDD working mode, the performing SRS antenna switching in the first network according to the priority order comprises:
stopping data transmission through the second network; and
performing SRS antenna switching in the first network by using a first antenna set, wherein the first antenna set comprises a transmission antenna used by the second network.

4. The method according to claim 3, wherein the stopping data transmission through the second network comprises:
determining a slot or a symbol period of the SRS antenna switching;
stopping data transmission through the second network in the slot or symbol period.

5. The method according to claim 4, wherein the stopping data transmission through the second network in the slot or symbol period comprises:
stopping data transmission and data receiving through the second network in the slot or the symbol period; and
the performing SRS antenna switching in the first network by using a first antenna set comprises:
performing SRS antenna switching in the first network by using a second antenna set, wherein the second antenna set comprises a receiving antenna used by the second network and an antenna in the first antenna set.

6. A terminal device, comprising a processor, a memory, and a computer program stored in the memory and executable on the processor, wherein the computer program, when executed by the processor, causes the terminal device to perform:
in a case that the terminal device is in a dual network connected state, determining a first network used to transmit control plane data and a second network only used to transmit user plane data;
determining a working mode of the second network in a case that a sounding reference signal (SRS) switching request is received;
determining a priority order of transmission antenna switching in the first network and the second network according to the working mode of the second network; and
performing SRS antenna switching in the first network according to the priority order; wherein
the computer program, when executed by the processor, causes the terminal device to perform:
determining that a priority of the first network is lower than a priority of the second network in a case that the second network is in a time division duplex (TDD) working mode; or
determining that a priority of the first network is higher than a priority of the second network in a case that the second network is in a frequency division duplexing (FDD) working mode.

7. The terminal device according to claim 6, wherein the computer program, when executed by the processor, causes the terminal device to perform:
in a case that the second network is in the TDD working mode, performing SRS antenna switching in the first network in a receiving slot of the second network.

8. The terminal device according to claim 6, wherein the computer program, when executed by the processor, causes the terminal device to perform:
in a case that the second network is in the FDD working mode, stopping data transmission through the second network; and
performing SRS antenna switching in the first network by using a first antenna set, wherein the first antenna set comprises a transmission antenna used by the second network.

9. The terminal device according to claim 8, wherein the computer program, when executed by the processor, causes the terminal device to perform:
determining a slot or a symbol period of the SRS antenna switching;
stopping data transmission through the second network in the slot or symbol period.

10. The terminal device according to claim 9, wherein the computer program, when executed by the processor, causes the terminal device to perform:
stopping data transmission and data receiving through the second network in the slot or the symbol period; and
performing SRS antenna switching in the first network by using a second antenna set, wherein the second antenna set comprises a receiving antenna used by the second network and an antenna in the first antenna set.

11. A non-transitory computer-readable storage medium, wherein the non-transitory computer-readable storage medium stores a computer program, and the computer program, when executed by a processor of a terminal device, causes the terminal device to perform:
in a case that the terminal device is in a dual network connected state, determining a first network used to transmit control plane data and a second network only used to transmit user plane data;

determining a working mode of the second network in a case that a sounding reference signal (SRS) switching request is received;

determining a priority order of transmission antenna switching in the first network and the second network according to the working mode of the second network; and performing SRS antenna switching in the first network according to the priority order; wherein the computer program, when executed by the processor, causes the terminal device to perform:

determining that a priority of the first network is lower than a priority of the second network in a case that the second network is in a time division duplex (TDD) working mode; or determining that a priority of the first network is higher than a priority of the second network in a case that the second network is in a frequency division duplexing (FDD) working mode.

12. The non-transitory computer-readable storage medium according to claim 11, wherein the computer program, when executed by the processor, causes the terminal device to perform:

in a case that the second network is in the TDD working mode, performing SRS antenna switching in the first network in a receiving slot of the second network.

13. The non-transitory computer-readable storage medium according to claim 11, wherein the computer program, when executed by the processor, causes the terminal device to perform:

in a case that the second network is in the FDD working mode, stopping data transmission through the second network; and performing SRS antenna switching in the first network by using a first antenna set, wherein the first antenna set comprises a transmission antenna used by the second network.

14. The non-transitory computer-readable storage medium according to claim 13, wherein the computer program, when executed by the processor, causes the terminal device to perform:

determining a slot or a symbol period of the SRS antenna switching;

stopping data transmission through the second network in the slot or symbol period.

15. The non-transitory computer-readable storage medium according to claim 14, wherein the computer program, when executed by the processor, causes the terminal device to perform:

stopping data transmission and data receiving through the second network in the slot or the symbol period; and performing SRS antenna switching in the first network by using a second antenna set, wherein the second antenna set comprises a receiving antenna used by the second network and an antenna in the first antenna set.

* * * * *